(12) United States Patent
Goodrich (10) Patent No.: US 7,287,336 B1
(45) Date of Patent: *Oct. 30, 2007

(54) APPARATUS FOR PRODUCING A VISIBLE LINE OF LIGHT ON A SURFACE, PARTICULARLY A WALL

(75) Inventor: Gary Goodrich, Union City, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 692 days.

This patent is subject to a terminal disclaimer.

(21) Appl. No.: 10/721,008

(22) Filed: Nov. 24, 2003

Related U.S. Application Data (63) Continuation-in-part of application No. 10/338,764, filed on Jan. 7, 2003, now abandoned, which is a continuation of application No. 09/684,696, filed on Oct. 4, 2000, now Pat. No. 6,502,319.

(51) Int. Cl.
*G01C 15/02* (2006.01)
*G01B 11/26* (2006.01)
*B43L 13/00* (2006.01)

(52) U.S. Cl. .................. 33/286; 33/227; 33/DIG. 21

(58) Field of Classification Search .............. 33/286
See application file for complete search history.

(56) References Cited

U.S. PATENT DOCUMENTS

| 5,539,990 A * | 7/1996 | Le ............................ 33/283 |
| 5,782,003 A * | 7/1998 | Bozzo ........................ 33/291 |
| 6,163,969 A * | 12/2000 | Jan et al. .................... 33/282 |
| 6,195,902 B1 * | 3/2001 | Jan et al. .................... 33/286 |
| 6,829,834 B1 * | 12/2004 | Krantz ....................... 33/286 |
| 6,914,930 B2 * | 7/2005 | Raskin et al. ............. 372/109 |
| 6,964,106 B2 * | 11/2005 | Sergyeyenko et al. ...... 33/286 |
| 7,013,570 B2 * | 3/2006 | Levine et al. ............... 33/286 |
| 7,031,367 B2 * | 4/2006 | Marshall et al. .......... 372/109 |

* cited by examiner

*Primary Examiner*—Christopher W Fulton
(74) *Attorney, Agent, or Firm*—Thomas M. Freiburger (57) ABSTRACT

An apparatus and method for efficiently generating a visible line of light on a surface such as a wall or a floor for the purpose of facilitating the layout process used in construction. Reference marking elements on the instrument correspond to the light beam's position. One or more level vials may be included for indicating vertical and horizontal, as well as a magnet for mounting and a reference bracket for a stud-finder instrument. In one embodiment the instrument is self-leveling on one axis only and is useful for projecting one or more orthogonal lines on a wall surface. The instrument, self-leveling or not, can be combined with a stud finder.

13 Claims, 9 Drawing Sheets

APPARATUS FOR PRODUCING A VISIBLE LINE OF LIGHT ON A SURFACE, PARTICULARLY A WALL

BACKGROUND OF THE INVENTION

This application is a continuation-in-part of application Ser. No. 10/338,764, filed Jan. 7, 2003, now abandoned, which was a continuation of application Ser. No. 09/684,696 filed Oct. 4, 2000, now U.S. Pat. No. 6,502,319.

This invention relates to hand tools, and in particular the invention is concerned with a hand tool for projecting a reference beam of visible light for precise alignment on floors and walls.

For some time laser beams have been used in construction for level references, vertical references and layout on floors and walls. Typically a construction worker marks the floor or walls indicating the location of walls, windows, or other building elements to be constructed. A chalk line is often used to permanently mark the walls or floors. This is a two man job with one man holding one end of the chalked string while the other snaps it, releasing chalk dust which makes the mark.

Figure 1:
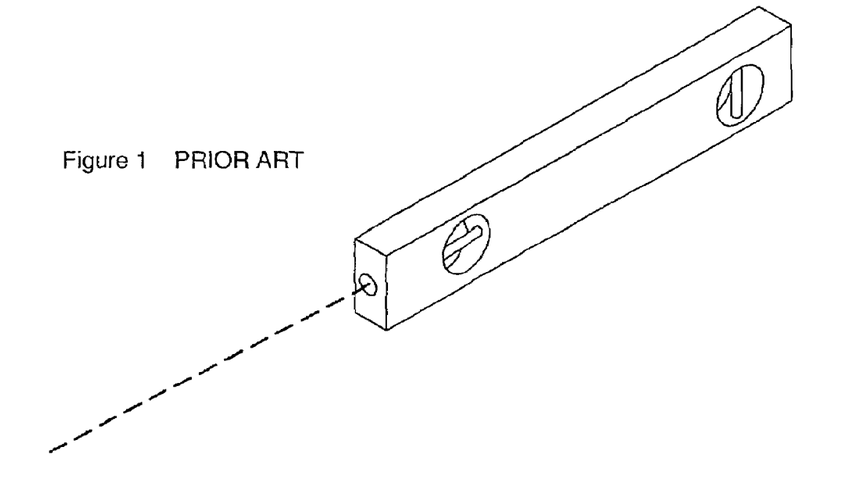
FIG. 1 is a perspective view showing a prior art carpenter's level with projected laser beam.
Figure 2:
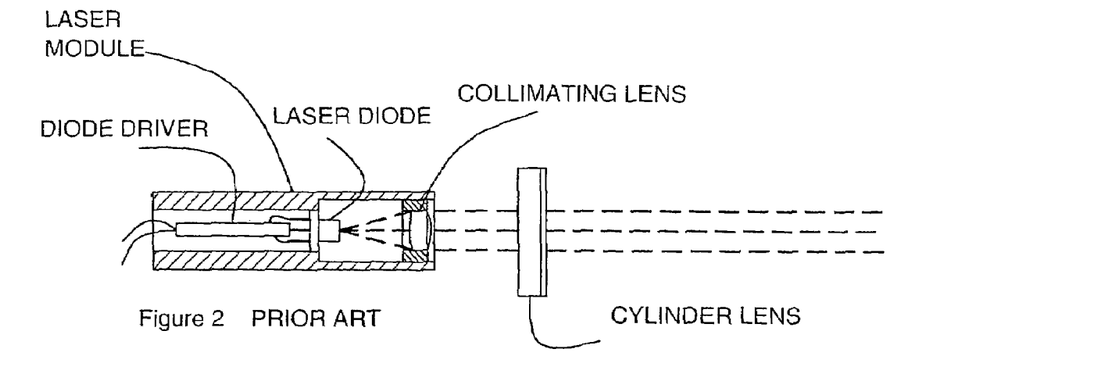
FIGS. 2 and 3 are elevation and plan views showing a prior art laser line projector schematically using a cylinder lens.
Figure 3:
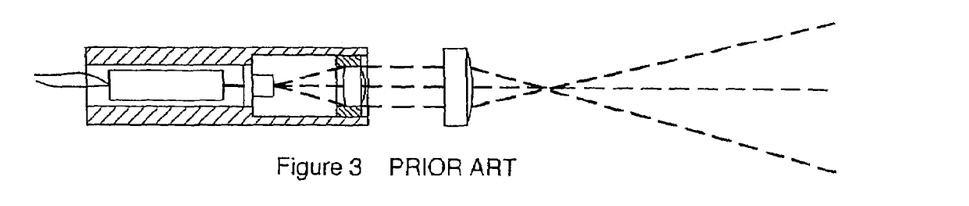

The most common prior laser device is a simple carpenter's level with level vials and with a laser beam projector attached. See FIG. 1. Many thousands of these are in use today. U.S. patents in this area include Genho U.S. Pat. No. 4,221,483, Rando U.S. Pat. No. 6,009,630 and others. Although indicating level, these levels do a poor job of projecting a beam on a floor or wall. The assignee of this invention has made a product for producing two beams of visible light on the floor for the purpose of laying out a 90° corner, described in U.S. Pat. No. 6,202,312, incorporated herein by reference. This instrument uses a collimated beam of light and an adjustable cylinder lens to convert the round beam into a fan of light and thus project a line on the surface. This is not a very efficient use of the laser diode light because of the natural divergence of the diode and cropping of the beam in collimation. Typically the laser diode beam divergence is 30° in one axis and 8° on the transverse axis. About half the light is lost in the collimation process. In addition, the line can be focused for only one distance. Such an optical system is shown in plan view in FIG. 2 herein and in side view in FIG. 3 herein, and is the present state of the art. Both the problems of efficient use of the laser light and focusing continuously along a line are solved by the current invention.

SUMMARY OF THE INVENTION

This invention allows the user to project a highly visible line on a surface. In addition it allows the line to be adjusted to true vertical or horizontal with the aid of a level vial when used on a vertical surface, e.g. a wall. An attachment to a stud-finder instrument is further provided. In some cases a magnet facilitates holding the unit to metal studs. The instrument is partially described in Disclosure Document No. 476310.

The simple, efficient optical system is an important feature of this invention. The instrument provides a highly visible line which can temporarily act as a chalk line for the purpose of marking points along the line, when requiring a more permanent mark, or for operations along the line with the laser line in place. Another important feature is embodied in a self-leveling laser instrument, with self-leveling along only one axis (in one plane), preferably via a type of pendulum in the instrument. The instrument can be put on a wall, will self-level in the only axis needed, and can project a single fan beam, or two 180° opposed fan beams, or even four fan beams in a cross configuration on the wall. These and other objects, advantages and features of the invention will be apparent from the following description of a preferred embodiment, considered along with the accompanying drawings.

DESCRIPTION OF PREFERRED EMBODIMENTS

Figure 4:
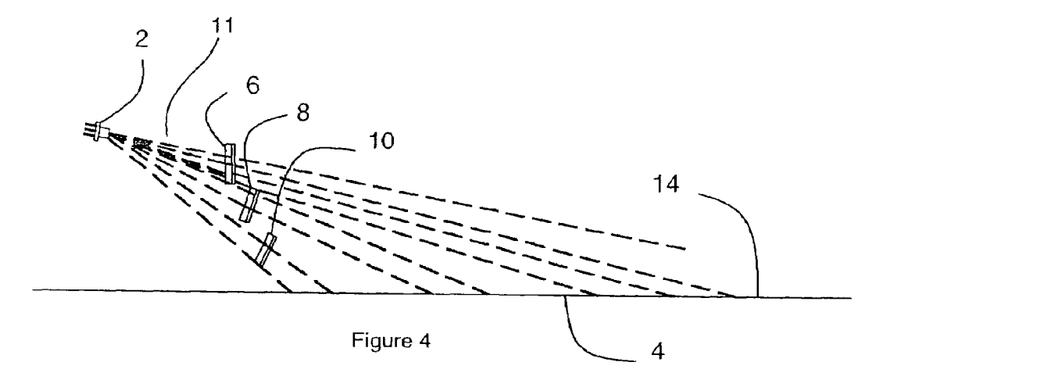
FIGS. 4 and 5 are elevation and plan views illustrating the principle of line projection according to the invention.
Figure 5:
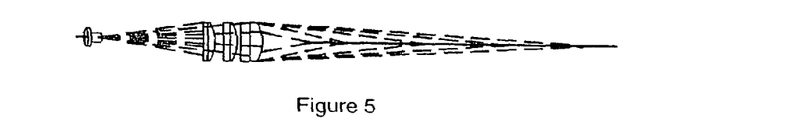

An optical system is shown in FIGS. 4 and 5. A laser diode 2 is positioned above a surface 4 to be marked, with the wide divergence angle of the laser, i.e. the major or long axis, perpendicular to the surface. In other words, a plane which is longitudinal relative to the laser diode and which includes the long axis of the beam is perpendicular to the surface. Cylinder lenses 6, 8, 10 project a beam 11 from the laser diode 2 onto a continuous line 14. The widths of the lenses are chosen to collect all the light from the narrow divergence angle (short axis) of the diode, substantially without cropping. The use of a plurality of lenses in the direction of the wide divergence (long axis) allows most of the light to be collected making the system efficient. The ability of each lens to be adjusted for a particular distance to produce a fine line is superior to the prior art; focus adjustment for distance can be done either by use of different focal length lenses or by adjustment of distance from the diode to each lens. The figures show how substantially all of the laser power in the wide and narrow divergence angles of the diode is projected into a tapering fan and into a line on a surface.

Figure 6:
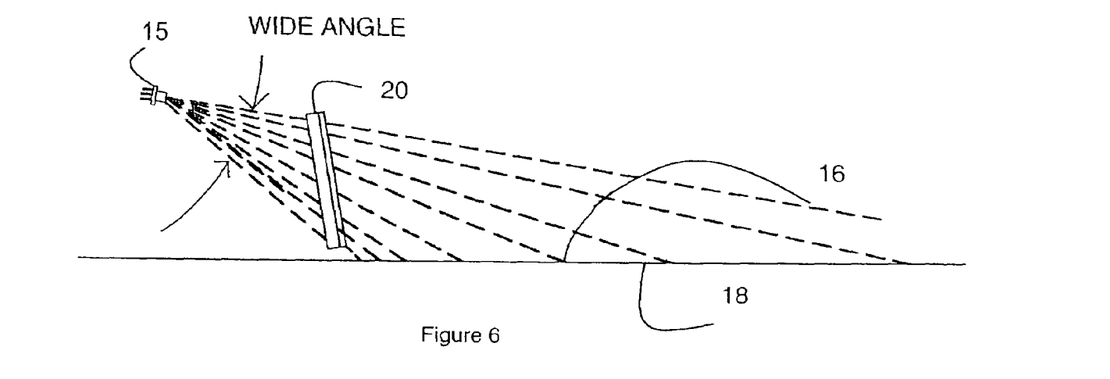
FIGS. 6 and 7 are elevation and plan views similar to FIGS. 4 and 5 but showing a different embodiment.
Figure 7:
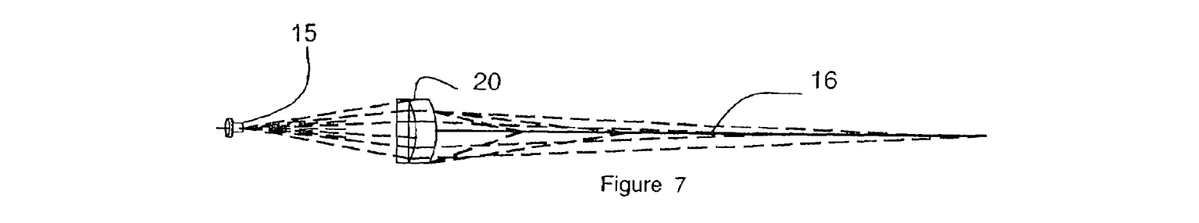

Another preferred embodiment of the optical system is shown in two views in FIGS. 6 and 7. A laser diode 14 projects a line 16 on a surface 18 using a single cylinder lens 20. The lens is tipped to provide the best focus for the entire surface by varying continuously the distance between the lens and the diode along the wide angle or long axis of the diode's beam. This provides variation for best focus on the line 16 on the surface. The diode is located preferably about 25 mm to 125 mm above (or away from) the surface to provide the angle needed to distribute the light along the floor (or other surface on which the device is used).

Figure 8:
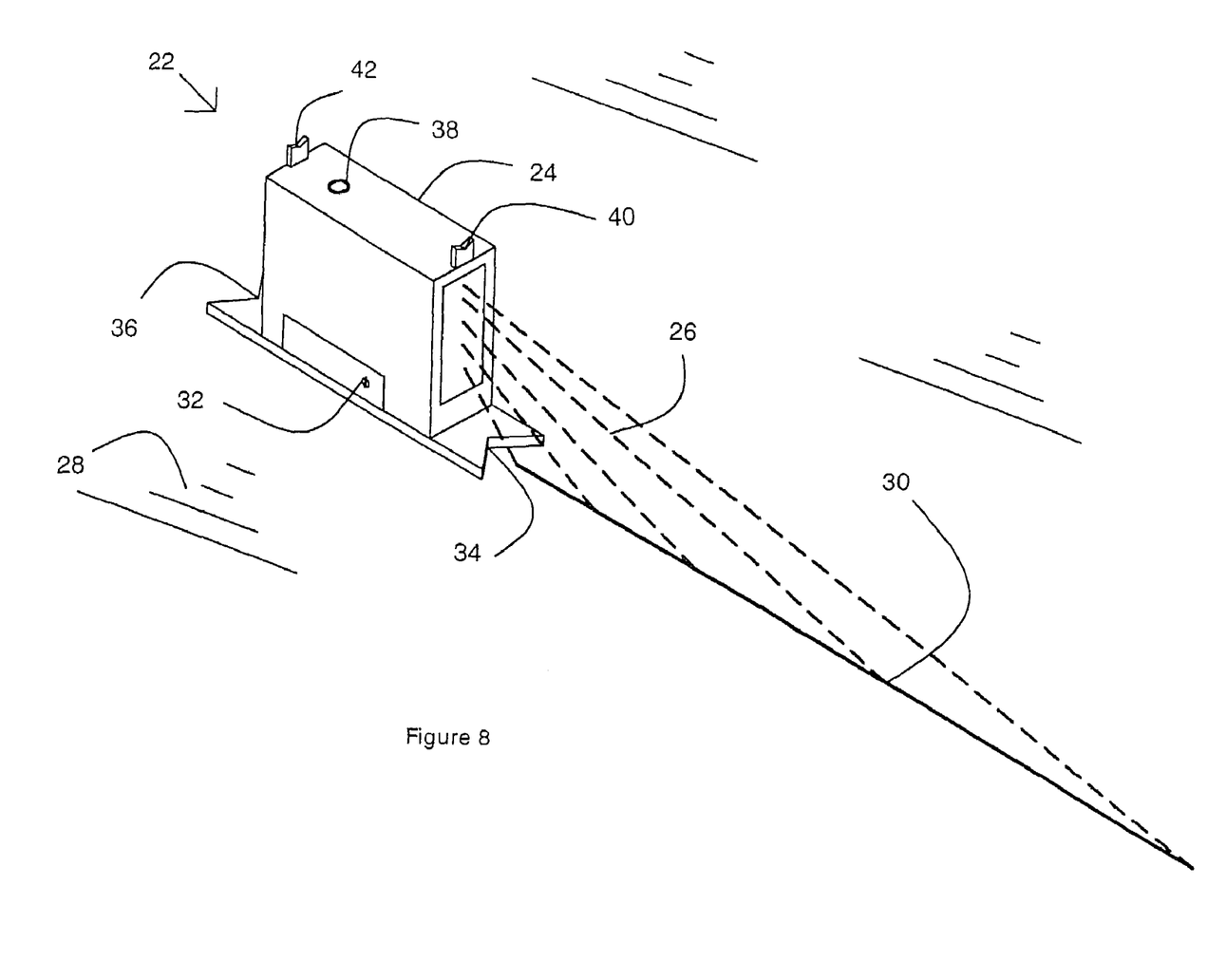
FIG. 8 is a schematic perspective view showing a laser instrument projecting a line on a surface in accordance with the principles of the invention.
Figure 9:
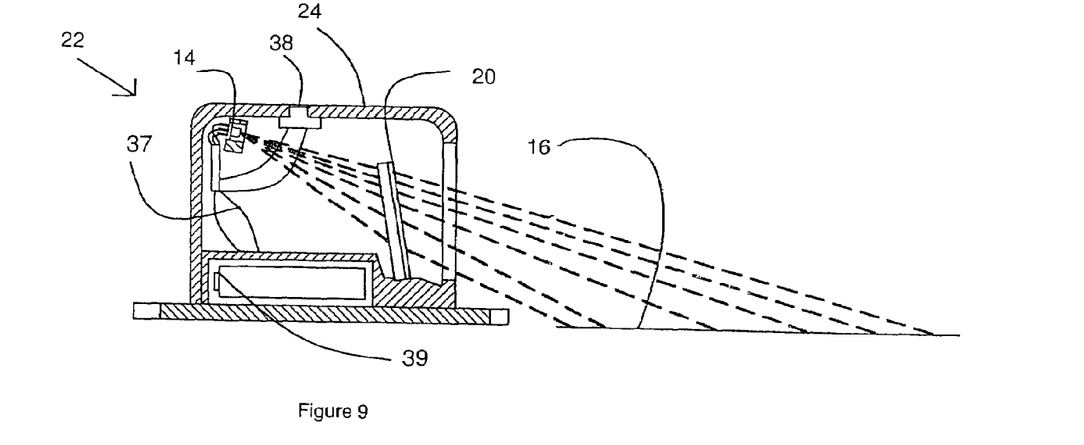
FIG. 9 is a sectional elevation view schematically showing the instrument of FIG. 8, with some elements omitted for clarity.

A preferred embodiment of an instrument is indicated generally by 22 in FIG. 8. A housing 24 contains the projection system described above. A fan-shaped beam 26 is projected onto a surface 28 to form a line 30. The housing has a battery door 32 and marking notches 34 and 36 which are in the same plane as the projected beam 26 and are used for positioning the line 30 and the instrument on marks on the floor during layout. An on-off switch 38 and sights 40 and 42 are in the plane of the beam 26 and may be used for sighting the instrument for desired alignment. Details of the internal construction of the instrument 22 are shown in FIG. 9. A battery 39 and wires 37 are included.

Figure 10:
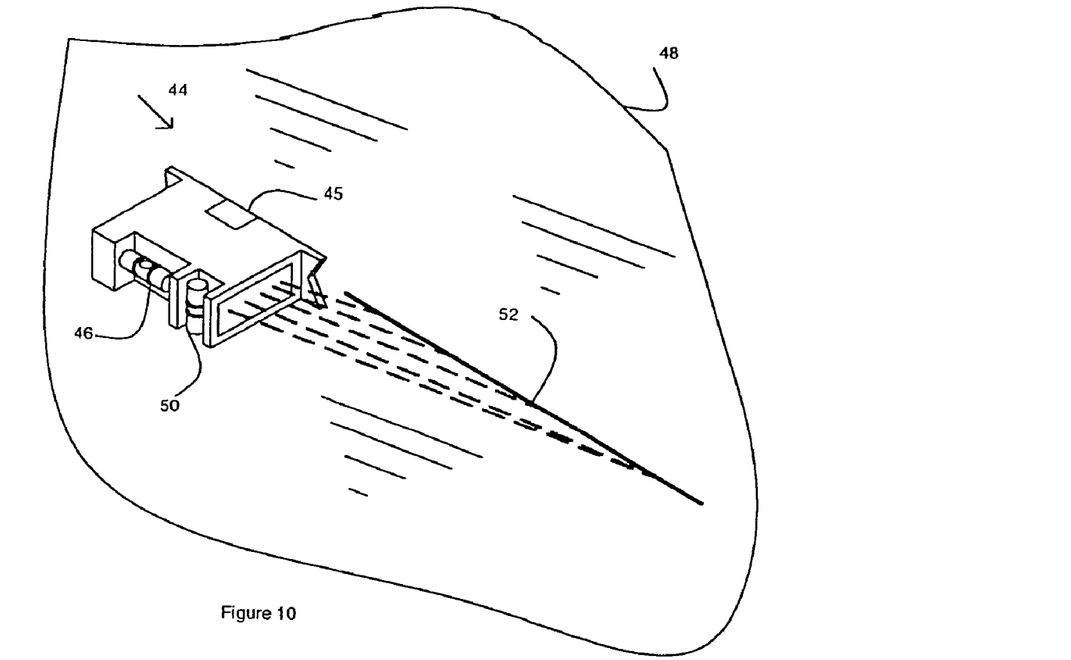
FIGS. 10 and 11 are perspective views illustrating use of the instrument on a wall, to project a line which may be horizontal or vertical on the wall surface.

A slightly modified instrument 44 shown in FIG. 10 is the same as 22 except for the addition of a horizontal indicating level vial 46. A magnet 45 is provided to hold the instrument to a steel stud as may be necessary from time to time. The sights and switch of FIGS. 8 and 9 have been removed for clarity in FIG. 10. The unit is positioned on a vertical wall 48. A second level vial 50 for indicating vertical is also mounted to the line projector. In this figure a horizontal line 52 is projected on the wall.

Figure 11:
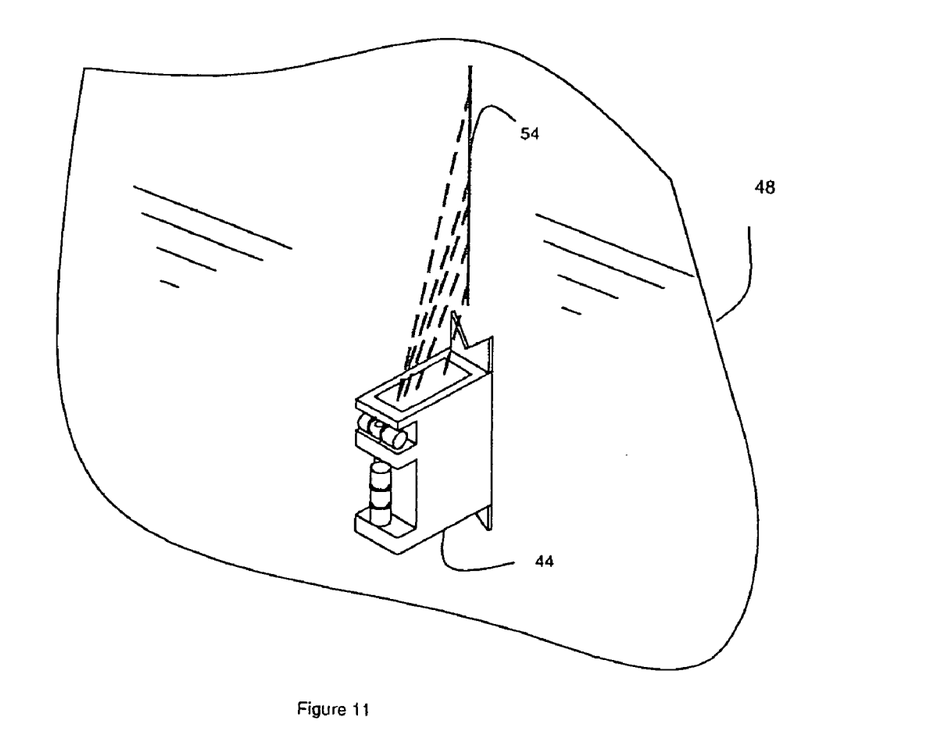

FIG. 11 shows the instrument of FIG. 10 positioned on the vertical wall projecting a vertical line 54 on the wall 48.

Figure 12:
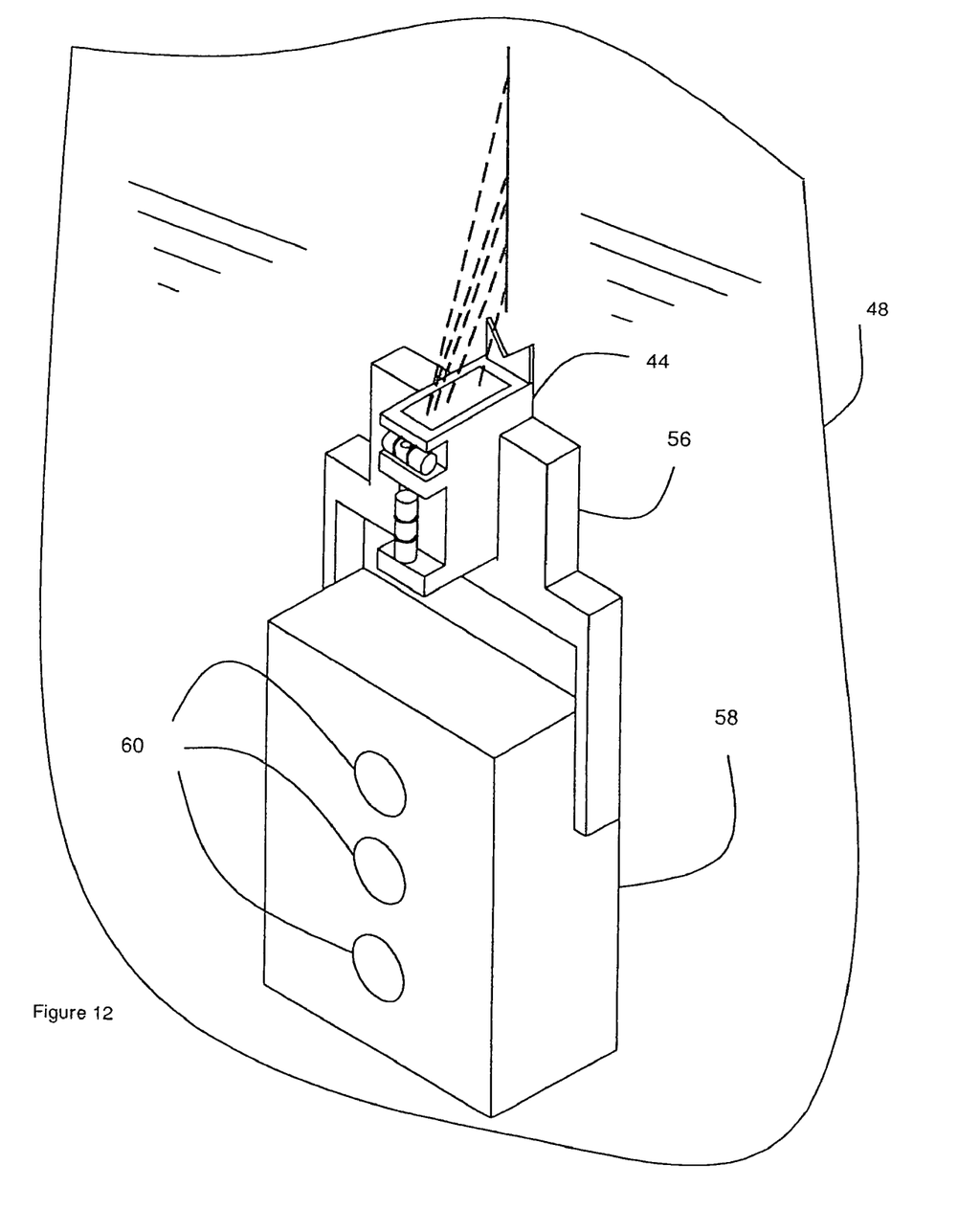
FIG. 12 is a perspective view showing the instrument used along with a stud finder, to project a vertical line indicating location of an entire stud.

FIG. 12 shows the instrument 44 of FIGS. 10 and 11 on the vertical wall 48 with a bracket 56 attached to the instrument. The bracket holds a stud-finder 58 which indicates the location of a stud behind a wall with its indicator lights 60. Using this combination instrument one location of the stud may be used to locate the entire length of a vertical stud. This eliminates the need to find the stud at several locations up and down the wall.

Figure 13:
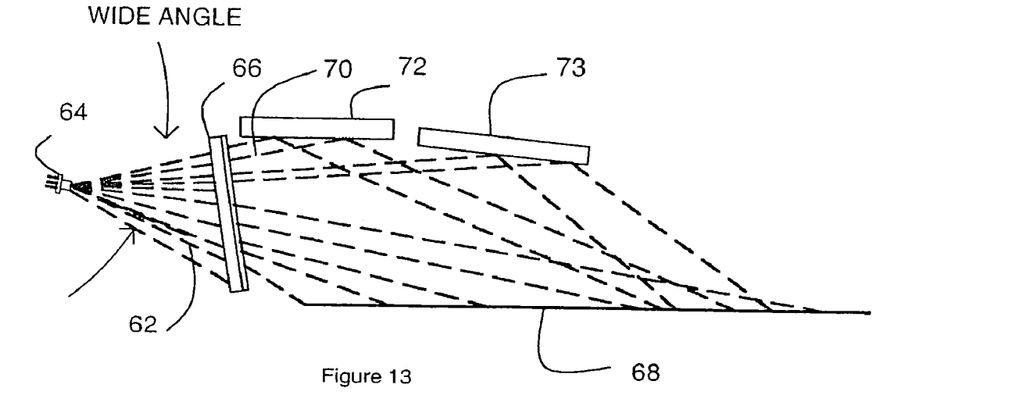
FIGS. 13, 14 and 15 are schematic side views showing the components of the invention projecting a line on a surface and showing three different methods for utilizing the entire wide angle of the diverging beam along the long axis.
Figure 14:
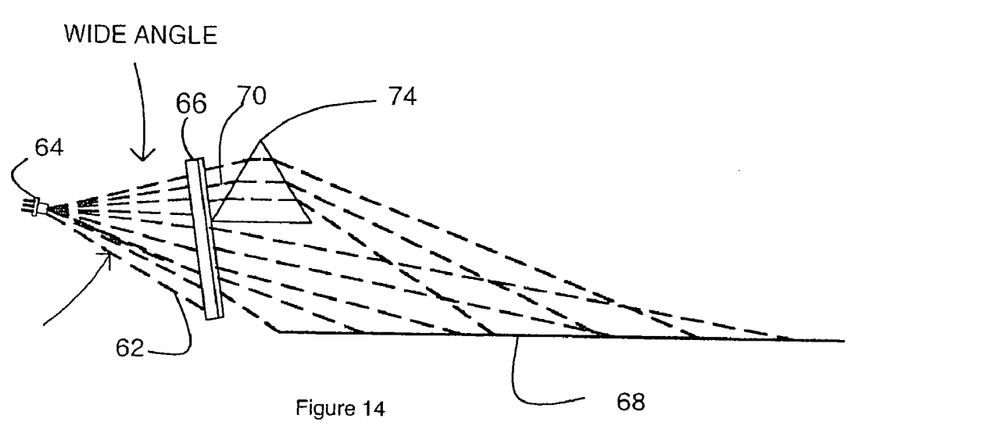
Figure 15:
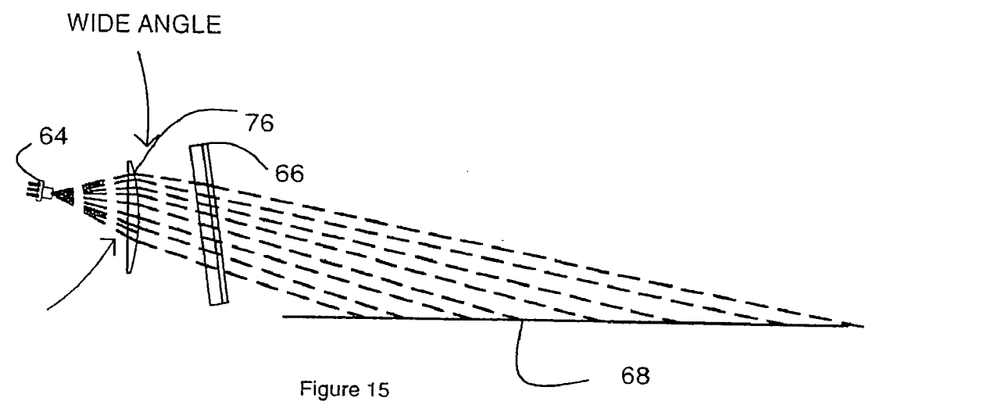

In another preferred embodiment the light in the wide angle divergence or long axis direction of the diode is used efficiently by employing one or more mirrors to reflect part of the light back onto the line as shown in FIG. 13. A laser diode 64 directs a beam of light 62 to a cylinder lens 66 to form a line 68. A portion of the light 70 exiting the lens 66 strikes mirrors 72 and 73 and is directed onto the line 68 increasing its brightness, at the distant portion of the line where the line is weakest. A prism 74 can also be used to redirect the portion 70 back onto the line 68 as shown in FIG. 14. FIG. 15 shows that a positive cylinder lens 76, oriented transversely to the cylinder lens 66, can be used to narrow the divergence of the diode laser beam as it reaches the cylinder lens 66 to efficiently use the power from the laser diode in this preferred embodiment. Instead of two separate cylinder lenses 66 and 76, a hybrid lens could be fashioned to accomplish both functions.

Figure 16:
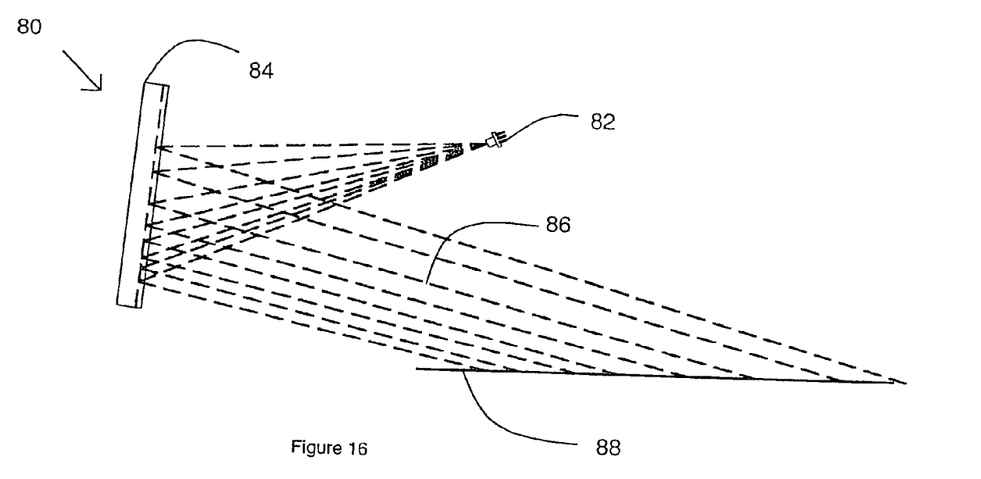
FIGS. 16 and 17 are schematic side views showing another form of the invention using cylindrical concave mirrors for focus in the narrow angle of the beam.
Figure 17:
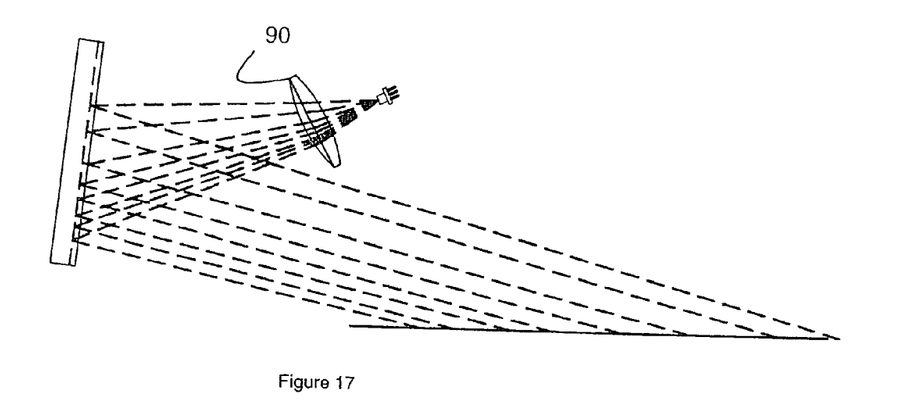

In another preferred embodiment the light beam is focused in the narrow angle of divergence with a cylindrical mirror instead of a cylinder lens, achieving similar beam distribution and focus. FIG. 16 shows the projector 80 comprising a laser diode 82 and cylindrical reflecting surface 84 projecting the beam, diverging in its wide angle as shown, from the laser diode into a fan of line 88 on a surface. The back-reflection arrangement shown allows the beam conveying element 84 to be placed at a proper angle of tilt to achieve optimum focus along the length of the line 88, as shown with the lens in FIGS. 6 and 13-15. The beam divergence in the wide angle can be further controlled by a lens 90 shown in FIG. 17 which otherwise contains the same elements of FIG. 16. It is also possible to include the optical power of the lens 90 in the mirror 84, by providing a mirror which curves concavely in the transverse direction, i.e. appearing arcuate and concave in side view, rather than linear as in FIGS. 16 and 17. This becomes an expensive optical element but is theoretically possible. In addition, the focus correction for a range of distance, as achieved by the tilted conveying element, could be realized using a concave cylinder reflecting surface that varies in radius of concavity along its length, to provide varying focal length for this narrow angle of divergence.

In another aspect of the present invention, an instrument is used to produce a plumb or level line on a wall, or several orthogonal lines on a wall, the instrument being self-leveling. In a preferred embodiment the instrument is self-leveling along only one axis, the axis which is horizontal and perpendicular to the wall; that is, the beam or beams are self-leveled in the plane of the wall surface, but not in the vertical plane which is perpendicular to the wall surface. In this way a simplified instrument can produce accurate level and/or plumb lines on a wall when the instrument is held against the wall in a position in which the housing of the instrument is flat against the wall but only roughly oriented with respect to level or plumb.

Figure 18:
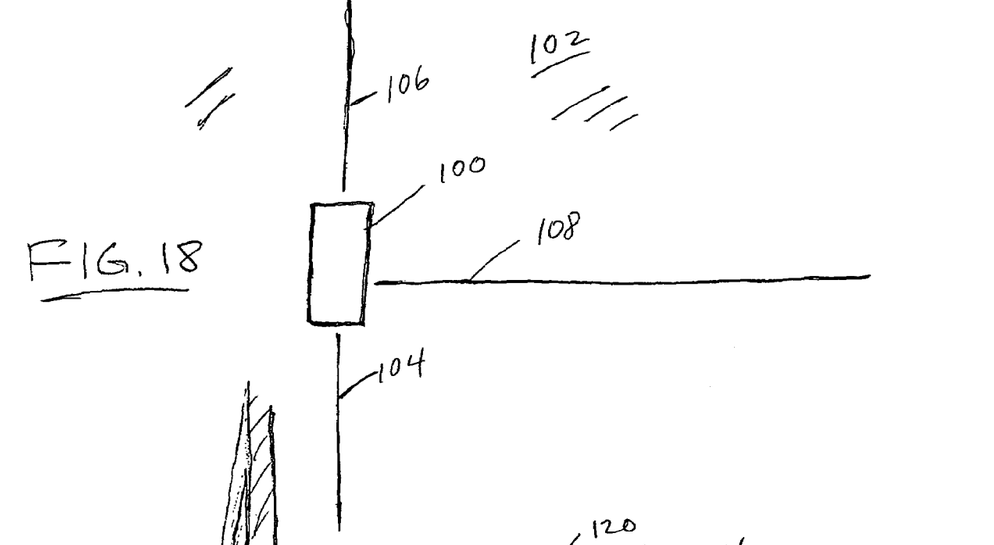
FIG. 18 is a schematic view showing a modified instrument which is self-leveling on one axis to achieve plumb and/or horizontal beams when the instrument is used against a wall.
Figure 19:
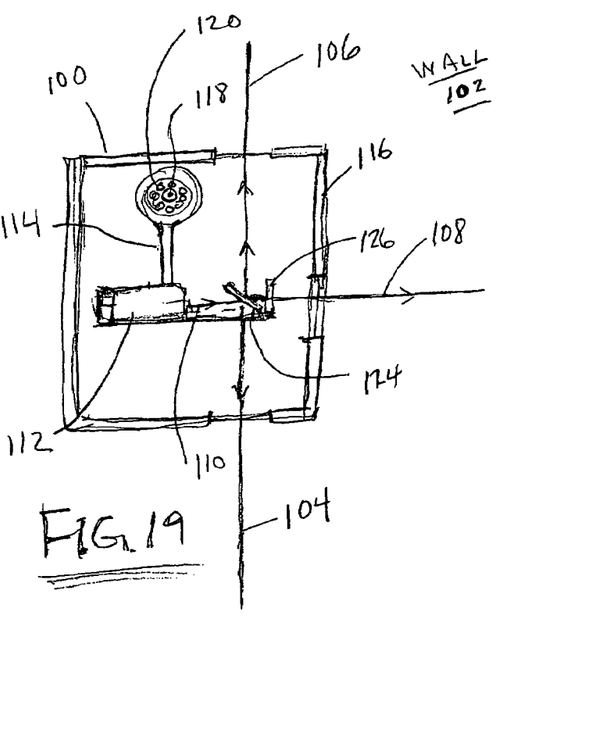
FIG. 19 is a simplified sectional elevation view showing a single-axis self-leveling arrangement and an example of a part of the optics for the instrument of FIG. 18.
Figure 20:
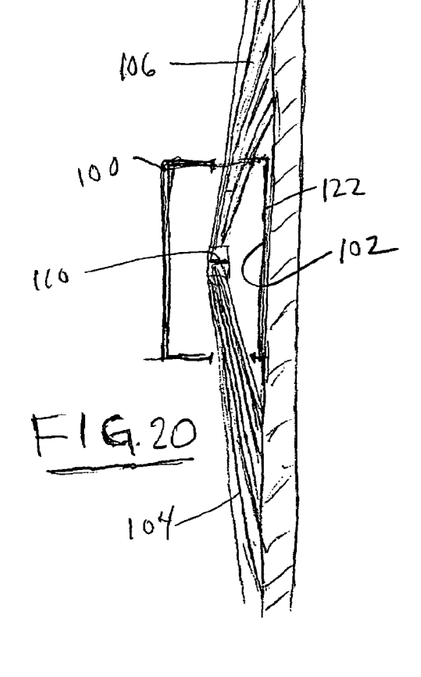
FIG. 20 is a simplified sectional elevation view of the FIG. 19 instrument in profile.

FIGS. 18-20 show, in schematic indications, such a tool for projecting a line or lines on a wall. In FIG. 18 a laser projecting instrument 100 is shown engaged against a wall 102. The instrument projects at least one fan beam 104, seen in edge view in FIG. 18, and the fan beam produces a line (104) on the wall surface 102. The instrument 100 can produce further beams if desired, such as an upward beam 106 in addition to the down beam 104, and optionally, a horizontal beam 108 or even two opposed horizontal beams. These orthogonal fan-shaped beams, all seen in edge view in FIG. 18, are all self-leveled by a single-axis self-leveling device in the instrument 100.

The optics described above can be used to produce a single fan-shaped beam 110 as seen in FIGS. 19 and 20. Those optics can be contained in an optics mounting assembly 112 which is suspended on a pendulum 114 within the housing 116 of the instrument. The pendulum 114 is suspended for self-leveling on a single axis, the axis being seen at 118 in FIG. 19. The axis 118 is perpendicular to the plane of the wall surface 102, so that self-leveling is only in the plane of the wall surface, not in a vertical plane perpendicular to the wall surface. A ball bearing is shown at 120, supporting the pendulum 115 for very low-friction rotation about the axis 118. The optics described above can be contained in the optics assembly 112, such that the fan-shaped beam 110 emanating from the assembly 112 is tilted somewhat toward the wall, i.e. toward the plane of a base side 122 of the instrument. If multiple beams are desired, the fan-shaped beam 110 can be reflected downwardly by a partially reflective/partially transmissive mirror 124 to produce the down beam 104 which will have the same fan-shaped characteristic and will incline toward the wall. The horizontal beam 108 can be produced by the transmitted portion of the beam 110. Further, if an upward fan beam 106 is desired, the transmitted portion of the beam 110 can be partially reflected by another reflective/transmissive mirror 126, so that a portion travels back to the left as seen in FIG. 19 and then is fully reflected from a reflective back surface of the mirror optic 124, to produce the upwardly-directed fan beam 106. FIG. 20 shows the up and down beams 106 and 104 in side view.

Alternatively, other optics can be used, involving full collimation of the laser beam. Multiple output beams can be produced, for example, using the optics of U.S. Pat. No. 6,542,304 which is incorporated herein by reference. That patent discloses use of a reflective pyramid device with a central hole, and this could provide three output beams in a single plane, generally as shown in FIGS. 18 and 19. Cylindrical lenses are then used to produce the fan beams, at the focus and at the desired aim. If four beams are desired, the optics of the above patent can be suspended from the same pendulum arrangement shown in FIG. 19, i.e. with the axis perpendicular to the wall, but with the laser directed parallel to the axis 118. The beam can then be reflected off a four-faceted pyramid type reflector without a hole, so that four orthogonal beams are produced in one plane, two vertical and two horizontal, with the appropriate cylinder lenses also attached on the pendulum platform (arrangement not illustrated).

The instrument preferably includes reference markings as described above, to indicate on the housing the position of the fan beam or beams. The instrument may be retained on the wall in the ways described above, such as with a magnet in the case of metal studs in the wall, or the housing can include a mounting hole at or near the top for a small nail or pin to be driven or pushed into the wall, or a removable adhesive can be used, such as a gummy adhesive that can readily be removed when desired, without leaving residue.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A method for producing a line of laser light on a surface, comprising:
    positioning a laser diode, of the type that produces an oblong beam diverging unequally in wide and narrow angles of divergence along two perpendicular axes, a long axis and a short axis, at a position spaced away from a surface on which a reference line is to be projected, and
    focusing the laser beam to converge the beam in the narrow angle of divergence on said short axis, to bring the beam into approximate focus along a line on said surface,
    whereby the wide angle of divergence of the laser diode's beam in the long axis is used to generate a line on the surface, in a simple and efficient optical system.

2. The method of claim 1, wherein the step of positioning the laser diode includes tilting the aim of the laser diode obliquely downwardly toward the surface.

3. The method of claim 1, wherein the focusing step comprises placing a converging lens in the path of the laser diode's beam and tilting the converging lens so as to be closer to the laser diode at a lens end more distant from the surface, and farther from the laser diode at an opposite lens end closer to the surface, to a lens orientation to maximize the focus of the laser beam along the line, in portions of the line both near the laser diode and distant from the laser diode.

4. The method of claim 1, wherein the laser diode is positioned about 25 to 125 mm away from the surface.

5. A method for producing a line of laser light on a wall surface and highlighting the position of a wall stud, comprising:
    providing a laser instrument that includes a laser diode and optics receiving light from the laser diode and producing a fan-shaped beam of light from the instrument, oriented such that a plane in which the fan-shaped beam generally is positioned is generally perpendicular to a base of the instrument, the base being adapted to engage against a wall surface, and with a stud finder attached to the laser instrument, in a position such that the fan of light produced by the instrument is aligned with an indicator on the stud finder showing the location of a wall stud, and
    placing the instrument and attached stud finder against a substantially vertical wall, moving the instrument and stud finder to locate a wall stud inside the wall, and, with the instrument projecting the fan-shaped beam substantially vertically, indicating with a line produced by the beam a protracted length of the stud in the wall.

6. The method of claim 5, wherein the laser instrument includes self-leveling means for projecting a substantially truly plumb fan-shaped beam even when the instrument is not oriented truly level or plumb, so that the instrument can be placed in only approximately level orientation on the wall to project the beam substantially vertically.

7. A laser instrument for producing a line on a wall surface, comprising:
    a housing having a base side and having an exit window for a laser beam,
    a laser diode in the housing producing a laser beam, and optics in the path of the beam to generate a generally fan-shaped output beam oriented such that a plane essentially including the fan-shaped beam is generally perpendicular to the housing base side such that the output beam produces a line on a surface on which the base side is placed,
    single-axis self-leveling means in the housing for compensating for small tilt angles of the housing as the housing is positioned with the base side against a wall to thus correct the output beam to substantially level or plumb, said small tilt angles being due to slight rotation of the housing from truly level or plumb in the plane of the wall surface, the instrument being without self-leveling tilt compensation in a plane perpendicular to the wall surface, and
    a stud finder attached to the instrument's housing, the stud finder having an indicator to show the location of a wall stud in a wall,
    whereby with the base side of the instrument against the wall surface the instrument is sufficiently close to level and plumb in a vertical plane perpendicular to the wall surface, and the single-axis self-leveling means substantially corrects for any tilt of the instrument in the plane of the wall surface, and whereby the instrument with the stud finder can be placed on the wall at the location of a stud and a plumb or level line can be projected onto the wall surface.

8. The instrument of claim 7, wherein the instrument is positioned relative to the stud finder such that substantially includes the indicator on the stud finder, and wherein the instrument projects a plumb output beam, whereby the instrument can be used on a vertical stud wall to locate a projected length of a wall stud.

9. The instrument of claim 7, including a bracket attaching the instrument's housing to the stud finder.

10. A laser instrument for producing a line on a wall surface comprising:
- a housing having a base side and having an exit window for a laser beam,
- a laser diode in the housing producing a laser beam, and optics in the path of the beam to generate a generally fan-shaped output beam oriented such that a plane essentially including the fan-shaped beam is generally perpendicular to the housing base side such that the output beam produces a line on a surface on which the base side is placed, and
- leveling means in the housing for orienting the housing substantially level or plumb in the plane of the wall when the housing is placed against the wall surface, so that the output beam is substantially level or plumb, and
- a stud finder attached to the instrument's housing, the stud finder having an indicator to show the location of a wall stud in a wall.

11. The instrument of claim 10, wherein the instrument is positioned relative to the stud finder such that said plane essentially including the fan-shaped beam substantially includes the indicator on the stud finder, and wherein the instrument projects a plumb output beam, whereby the instrument can be used on a vertical stud wall to locate a projected length of a wall stud.

12. The instrument of claim 10, wherein the leveling means comprises a vertical-indicating level vial on the housing, oriented so as to allow adjustment of the instrument to produce a vertical line of light when the instrument is used with its base side flat against a substantially vertical surface.

13. The instrument of claim 12, wherein the housing further includes a horizontal-indicating level vial.

\* \* \* \* \*